(12) United States Patent
Gensewich

(10) Patent No.: US 11,541,508 B2
(45) Date of Patent: Jan. 3, 2023

(54) METHOD FOR TREATING A SURFACE OF A FIBRE COMPOSITE COMPONENT

(71) Applicant: Premium Aerotec GmbH, Augsburg (DE)

(72) Inventor: Christian Gensewich, Nordenham (DE)

(73) Assignee: Premium Aerotec GmbH

( * ) Notice: Subject to any disclaimer, the term of this patent is extended or adjusted under 35 U.S.C. 154(b) by 991 days.

(21) Appl. No.: 16/182,918

(22) Filed: Nov. 7, 2018

(65) Prior Publication Data

US 2019/0143484 A1 May 16, 2019

(30) Foreign Application Priority Data

Nov. 10, 2017 (DE) .......................... 102017220032.4

(51) Int. Cl.
| | |
|---|---|
| *B24C 9/00* | (2006.01) |
| *B24C 3/32* | (2006.01) |
| *B24C 1/06* | (2006.01) |
| *B24C 3/06* | (2006.01) |
| *B24C 1/00* | (2006.01) |
| *B24C 5/04* | (2006.01) |
| *B24C 7/00* | (2006.01) |
| *B24C 11/00* | (2006.01) |
| *B29C 65/00* | (2006.01) |

(52) U.S. Cl.
CPC .............. *B24C 9/003* (2013.01); *B24C 1/006* (2013.01); *B24C 1/06* (2013.01); *B24C 3/065* (2013.01); *B24C 3/32* (2013.01); *B24C 5/04* (2013.01); *B24C 7/0046* (2013.01); *B29C 66/02245* (2013.01); *B29C 66/721* (2013.01); *B24C 11/00* (2013.01); *B29C 66/71* (2013.01); *B29C 66/739* (2013.01)

(58) Field of Classification Search
CPC .. B24C 1/06; B24C 3/065; B24C 3/32; B24C 5/04; B24C 7/0046; B24C 9/003; B29C 66/02245; B29C 66/721
See application file for complete search history.

(56) References Cited

U.S. PATENT DOCUMENTS

| | | | | |
|---|---|---|---|---|
| 2,628,456 A | * | 2/1953 | Berg ........................ | B24C 3/065 451/87 |
| 2,723,498 A | * | 11/1955 | Hastrup .................. | B24C 3/065 451/88 |
| 2,770,924 A | * | 11/1956 | Mead ...................... | B24C 3/062 451/88 |

(Continued)

FOREIGN PATENT DOCUMENTS

| | | |
|---|---|---|
| DE | 198 02 308 A1 | 7/1998 |
| DE | 10 2005 045470 A1 | 4/2006 |

(Continued)

*Primary Examiner* — Orlando E Aviles
*Assistant Examiner* — Marcel T Dion
(74) *Attorney, Agent, or Firm* — Lerner, David, Littenberg, Krumholz & Mentlik, LLP

(57) ABSTRACT

A method for treating a surface of a fibre composite component, wherein an abrasive removal of the surface of the fibre composite component takes place by blasting a removing agent transported by a gaseous transporting fluid onto the surface of the fibre composite component by a feed nozzle and a suction extraction of the removing agent and material removed by the removing agent takes place by an extraction nozzle arranged in the region of the feed nozzle.

9 Claims, 4 Drawing Sheets

(56) References Cited

U.S. PATENT DOCUMENTS

| | | | | |
|---|---|---|---|---|
| 3,906,673 | A * | 9/1975 | Goto | B24C 3/06 451/92 |
| 4,395,850 | A * | 8/1983 | Brown | B24C 5/02 451/102 |
| 4,563,840 | A * | 1/1986 | Urakami | B24C 5/04 239/120 |
| 4,646,480 | A * | 3/1987 | Williams | B24C 3/065 451/87 |
| 4,984,396 | A * | 1/1991 | Urakami | B24C 3/065 451/87 |
| 6,012,975 | A * | 1/2000 | Jager | B24C 5/04 451/87 |
| 6,273,154 | B1 | 8/2001 | Laug | |
| 6,283,833 | B1 * | 9/2001 | Pao | B24C 5/04 451/39 |
| 7,182,671 | B1 * | 2/2007 | Shimizu | B24C 9/006 451/8 |
| 8,715,553 | B2 | 5/2014 | Barlag et al. | |
| 8,801,499 | B2 * | 8/2014 | Yoshizawa | B24C 9/003 451/38 |
| 2005/0076937 | A1 * | 4/2005 | Jung | G21F 9/001 134/37 |
| 2005/0130565 | A1 * | 6/2005 | Oellerich | B24C 1/06 451/38 |
| 2010/0122719 | A1 * | 5/2010 | Mase | B24C 1/086 451/87 |
| 2010/0255759 | A1 * | 10/2010 | Ohashi | B24C 3/325 451/38 |
| 2011/0104991 | A1 * | 5/2011 | O'Donoghue | C23C 4/02 451/36 |
| 2012/0301643 | A1 * | 11/2012 | Aadland | B24C 9/006 428/34.1 |
| 2013/0112779 | A1 * | 5/2013 | Giovannini | B24C 7/0046 239/488 |
| 2013/0145573 | A1 * | 6/2013 | Bizhanzadeh | B65G 53/526 15/300.1 |
| 2015/0130565 | A1 | 5/2015 | Henderson et al. | |
| 2018/0297172 | A1 | 10/2018 | Usui et al. | |

FOREIGN PATENT DOCUMENTS

| | | | |
|---|---|---|---|
| DE | 10 2015 220969 A1 | 4/2017 | |
| EP | 3 375 568 A1 | 9/2018 | |
| JP | H10 6221 A | 1/1998 | |
| WO | 2004/067229 A1 | 8/2004 | |
| WO | 2005/095057 A1 | 10/2005 | |
| WO | WO-2008044613 A1 * | 4/2008 | B24C 1/083 |
| WO | 2009/135922 A1 | 11/2009 | |
| WO | 2011/030924 A2 | 3/2011 | |
| WO | 2017/081730 A1 | 5/2017 | |

* cited by examiner

METHOD FOR TREATING A SURFACE OF A FIBRE COMPOSITE COMPONENT

FIELD OF THE INVENTION

The present invention relates to a method for treating a surface of a fibre composite component.

BACKGROUND OF THE INVENTION

In vehicle construction in general, and in aircraft construction in particular, fibre composite components, that is to say structural components produced from fibre composite materials, are increasingly being used, because they have a high mechanical strength in relation to the weight of the component. In aircraft construction in particular, the fibre composite components are often adhesively bonded to further components. Such adhesively bonded connections have to meet high requirements with respect to mechanical strength. To be able to meet these requirements, a treatment of the surface of the fibre composite component is usually necessary before the adhesive bonding.

Apart from grinding down the surface, abrasive blasting methods are usually used for the surface treatment. WO 2004/067229 A1 describes removing a surface layer by blasting the surface by means of an abrasive agent distributed in a gaseous fluid. According to WO 2009/135922 A1, a removal of the surface likewise takes place by an abrasive agent, the abrasive agent having a lower hardness than the fibres of the fibre composite component to prevent the fibres from being damaged.

BRIEF SUMMARY OF THE INVENTION

An aspect of the present invention may provide an improved method for treating a surface of a fibre composite component.

According to a first aspect of the invention, a method for treating a surface of a fibre composite component is provided. According to this method, an abrasive removal of the surface of the fibre composite component takes place by blasting a removing agent transported by a gaseous transporting fluid onto the surface of the fibre composite component by means of a feed nozzle and a suction extraction of the removing agent as well as material removed by the removing agent takes place by means of an extraction nozzle arranged in the region of the feed nozzle.

According to an aspect of the present invention, therefore, at the same time as a blasting application of removing granules, a suction extraction of the particles of the fibre composite component removed by the granules or removing agent and of the granules themselves takes place from the region in which the removal takes place. This offers the advantage that a development of dust is significantly reduced in comparison with customary blasting methods.

The transporting of the removing agent takes place according to an aspect of the invention in a transporting fluid, which is conducted through a feed nozzle onto the surface to be treated of the component. The transporting fluid is in this case subjected to a certain pressure. The suction extraction takes place through an extraction nozzle, the opening of which is spatially arranged in the region of the feed nozzle, and at the opening of which a certain negative pressure with respect to ambient pressure prevails. Here, the transporting fluid fed through the feed nozzle is extracted again by suction, and with it the removed particles of material and the removing agent.

In particular, the pressure in the extraction nozzle can be set independently of the pressure of the transporting fluid in the feed nozzle. In this way, the extraction rate can be adapted individually to different rates of removal.

According to a further embodiment of the method, the blasting application through the feed nozzle takes place in a working space that is formed by a bell placed onto the surface of the fibre composite component, the removing agent and the removed material being extracted from the working space by suction by means of the extraction nozzle. Accordingly, the removal of the surface takes place under a bell or hood. The feed nozzle and the extraction nozzle project into the removal space and may in particular be led through clearances formed in a wall of the bell. The use of the bell further reduces the development of dust while the method is being carried out.

According to one embodiment, it may be provided in particular that the bell has an abutting edge, which is facing the surface of the fibre composite component, a sealing device for sealing the working space with respect to the surface of the fibre composite component being arranged at the abutting edge. The abutting edge forms in particular an opening of the bell. Arranged at this edge is a sealing device, which is intended to lie against the surface of the fibre composite component. During the removal, the bell is placed with the sealing device onto the surface of the fibre composite component. The sealing device may for example be realized in the form of a brush seal, which is formed by a multiplicity of small elastically deformable plastic bristles which project from the abutting edge. The sealing device improves the sealing of the working space, in particular when the bell lies against curved or uneven surface regions.

According to a further embodiment, the working space is sealed with respect to a rear surface of the fibre composite component during the removal of an edge region of the surface of the fibre composite component. It is accordingly provided that, during the removal of a region of the surface extending along an edge of the fibre composite component, a sealing of the working space around this edge is performed with respect to a rear surface situated opposite the surface worked. This may for example take place as a result of a design of the sealing device, the latter enclosing the edge of the fibre composite component and thereby lying against the surface worked and the rear side surface. In this way, a development of dust can be reduced even when there is a movement of the abutting edge of the bell beyond the edge of the fibre composite component. Furthermore, as a result of the sealing, the pressure in the working space prevents pressure fluctuations in the working space when there is a movement of the abutting edge of the bell beyond the edge of the fibre composite component, so that an even more uniform removal of the surface takes place.

According to a further embodiment, it is provided that the fibre composite component extends in a longitudinal direction, the removal taking place in strips along the longitudinal direction, starting from a side edge of the fibre composite component. The feed nozzle and the extraction nozzle and the fibre composite component are therefore moved here relative to one another along the longitudinal direction of the fibre composite component. The nozzles therefore pass along a strip of the surface of the fibre composite component and remove the surface in this strip. This is followed by a lateral displacement of the fibre composite component and the nozzles transversely in relation to the longitudinal direction and a renewed movement of the nozzles and the component relative to one another along the longitudinal direction of the fibre composite component. As a result, a further strip of the surface of the fibre composite component is removed. In this way, the number of changes of direction necessary for removing a specific area content of the surface is advantageously reduced.

According to one embodiment of the method, it is provided that the extraction nozzle surrounds the feed nozzle in an annular manner. In particular, an opening of the feed nozzle and an opening of the extraction nozzle may be arranged concentrically. This design of the nozzles is very space-saving, allowing even small components to be worked precisely.

According to an alternative embodiment, the feed nozzle is arranged at a first angle relative to the surface of the fibre composite component. In particular, here a centre axis of an end portion of the feed nozzle forms a first angle with the surface of the fibre composite component. This angle may in particular lie between 30 degrees and 90 degrees, preferably between 45 degrees and 80 degrees. An angled alignment of the feed nozzle relative to the surface offers the advantage that the removing agent impinges on the surface at approximately this angle, which facilitates the transporting away of the removing agent and the removed material.

In particular, it may be provided that the extraction nozzle is arranged at a second angle relative to the surface of the fibre composite component and opposite the feed nozzle. In particular, here a centre axis of an end portion of the extraction nozzle forms a second angle with the surface of the fibre composite component. This angle may in particular lie between 30 degrees and 85 degrees, preferably between 45 degrees and 75 degrees. Furthermore, in particular an opening of the extraction nozzle is situated facing the feed nozzle. It may also be provided that the centre axis of the end portion of the extraction nozzle and the centre axis of the end portion of the feed nozzle form a plane that is preferably perpendicular to the surface of the fibre composite component. The transporting of material away from the surface is further improved by the nozzles being arranged opposite one another.

According to a further embodiment, the transporting fluid is transported to the surface at a pressure of between 0.25 bar and 8 bar, optionally between 1 bar and 5 bar, above ambient pressure. In this pressure range, good removal results are obtained for a large number of removing agents.

According to a further embodiment, glass granules, corundum granules or plastic granules are used as the removing agent. Generally, particle granules are used as the removing agent. The particles may take the form of bead-shaped granules, that is to say with a round grain shape, or take the form of fragments, that is to say with an angular grain shape. The glass granules may for example be produced from soda-lime glass. The corundum granules may for example be produced by fusion of alumina with the aid of an arc and for example comprise over 99 percent by weight $Al_2O_3$. Generally, the particles may in particular have a size of between 3 μm and 2000 μm, in particular between 5 μm and 500 μm, preferably between 10 μm and 200 μm. For example, with glass beads of between 100 μm and 200 μm that are blasted with a transporting fluid at approximately 3 bar onto a fibre composite material formed with epoxy resin as a matrix material, surfaces that can be wetted very well with liquid are formed by the removal.

According to a further embodiment, the fibre composite component is formed by a structural component of an aircraft, in particular by a stringer.

Here, a "fibre composite component" or a "fibre-reinforced component" is understood as meaning generally a component which comprises a fibrous material formed by a multiplicity of reinforcing fibres, in particular in the form of filaments or pieces of filament, such as for example carbon, glass, ceramic, aramid, boron, mineral, natural or synthetic fibres or mixtures of these, the fibrous material being embedded in a resin or matrix material, such as for example a thermosetting, thermoplastic or elastomeric resin or generally a synthetic resin or the like.

With regard to directional indications and axes, in particular directional indications and axes relating to the profile of physical structures, a path of an axis, of a direction or of a structure "along" another axis, direction or structure is understood here as meaning that these, in particular the tangents that arise at a respective point of the structures, run in each case at an angle of less than or equal to 45 degrees, preferably less than 30 degrees, and particularly preferably parallel, to one another.

With regard to directional indications and axes, in particular directional indications and axes relating to the profile of physical structures, a path of an axis, of a direction or of a structure "transversely" with respect to another axis, direction or structure is understood here as meaning that these, in particular the tangents that arise at a respective point of the structures, run in each case at an angle of greater than or equal to 45 degrees, preferably greater than or equal to 60 degrees, and particularly preferably perpendicular, to one another.

BRIEF DESCRIPTION OF THE FIGURES

The invention is explained below with reference to the figures of the drawings. In the figures.

Unless otherwise stated, the same reference designations are used in the figures to denote identical or functionally identical components.

DETAILED DESCRIPTION

Figure 1:
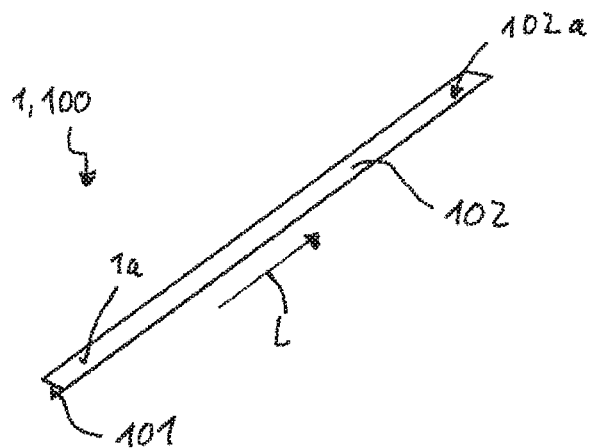
FIG. 1 shows a schematic perspective view of a fibre composite component in the form of a structural component of an aircraft.

FIG. 1 shows a schematic perspective view of a fibre composite component 1 in the form of a structural component 100 of an aircraft (not represented). The structural component 100 may be used in particular as a stringer, that is to say as a beam extending in a longitudinal direction of the fuselage. The fibre composite component 1 shown by way of example in FIG. 1 is formed as a sectional beam with a T-shaped cross section extending in a longitudinal direction L, the T-shaped cross section being formed by a longitudinal web 101 and a transverse web 102 extending transversely thereto. A surface 1a of the fibre composite component 1 that is intended for adhesive bonding to a further component 105 may be formed in particular by a first surface 102a of the transverse web 102. The longitudinal web 101 extends from a second surface 102b of the transverse web 102 that is situated opposite the first surface 102a.

Figures 2, 3:
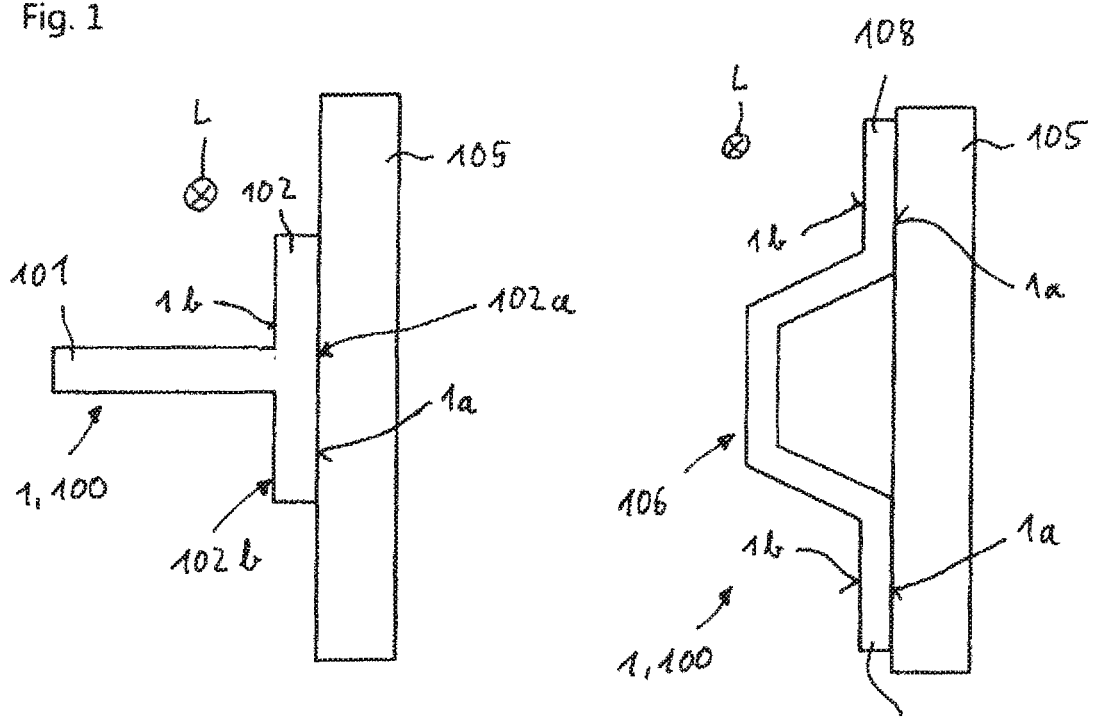
FIG. 2 shows a schematic sectional view of a fibre composite component in the form of a structural component of an aircraft that is adhesively bonded to an outer skin of an aircraft.
FIG. 3 shows a schematic sectional view of a further fibre composite component in the form of a stringer of an aircraft that is adhesively bonded to an outer skin of an aircraft.

As schematically represented in a sectional view in FIG. 2, the surface 1a of the fibre composite component 1 that is formed by the first surface 102a of the transverse web 102 may be adhesively bonded to a further component 105, for example an outer skin of the aircraft.

FIG. 3 shows by way of example a schematic sectional view of a fibre composite component 1 in the form of a structural component 100 that is adhesively bonded to a further component 105. As a difference from the structural component 100 shown in FIG. 2, the structural component 100 shown in FIG. 3 has an Ω-shaped cross section, which is formed by a middle section 106 with an approximately C-shaped cross-sectional form, and by two side webs 107, 108, which project from the middle section 106 on opposite sides. As can be seen in FIG. 3, the surface 1a of the fibre composite component 1 that is intended for the adhesive bonding to the further component 105 may be provided in particular on the side webs 107, 108.

The surface 1a of the fibre composite component 1 that is intended for the adhesive bonding is also referred to hereinafter as the bonding area 1a and must be treated before the adhesive bonding to the compound 105, in particular to reduce the surface roughness. The fibre composite component comprises a fibrous material, which is formed by a multiplicity of reinforcing fibres F, in particular in the form of filaments or pieces of filament, such as for example carbon, glass, ceramic, aramid, boron, mineral, natural or synthetic fibres or mixtures of these, the fibrous material being embedded in a resin or matrix material M, such as for example a thermosetting, thermoplastic or elastomeric resin or generally a synthetic resin or the like. This structure can be seen in FIG. 6, which shows a schematic sectional view of the fibre composite component 1 in the region of the bonding area 1a.

For treating a surface 1a of the fibre composite component 1, an abrasive removal of the surface 1a takes place by blasting removing agent 2 onto the surface 1a.

Figure 4:
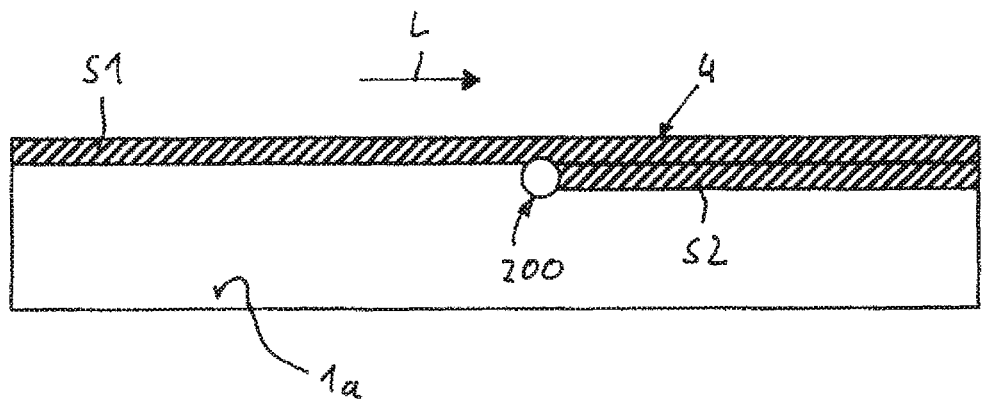
FIG. 4 shows a plan view of a surface of a fibre composite component while a method according to an exemplary embodiment of the present invention is being carried out.

FIG. 4 schematically shows a removal of the bonding area 1a as a plan view of the bonding area 1a. As schematically shown in FIG. 4, the removal may take place in particular in strips along the longitudinal direction L, starting from a side edge 4 of the fibre composite component 1. For this purpose, the fibre composite component 1 and a working device 200, represented in FIG. 4 symbolically as a circle, are moved relative to one another in the longitudinal direction L. As shown in FIG. 4, for example, first a first strip S1 may be removed over the entire longitudinal extent of the surface 1a by a relative movement of the working device 200 and the fibre composite component 1 relative to one another counter to the longitudinal direction L, the first strip S1 adjoining the side edge 4 of the fibre composite component 1. Subsequently, the fibre composite component 1 and the working device 200 are displaced relative to one another transversely in relation to the longitudinal direction L, so that the working device 200 is arranged next to the first strip S1. After that, a relative movement of the working device 200 and of the fibre composite component 1 is performed in the longitudinal direction L, whereby a second strip S2, adjoining the first strip S1, is removed, as is shown by way of example in FIG. 4.

Figure 7:
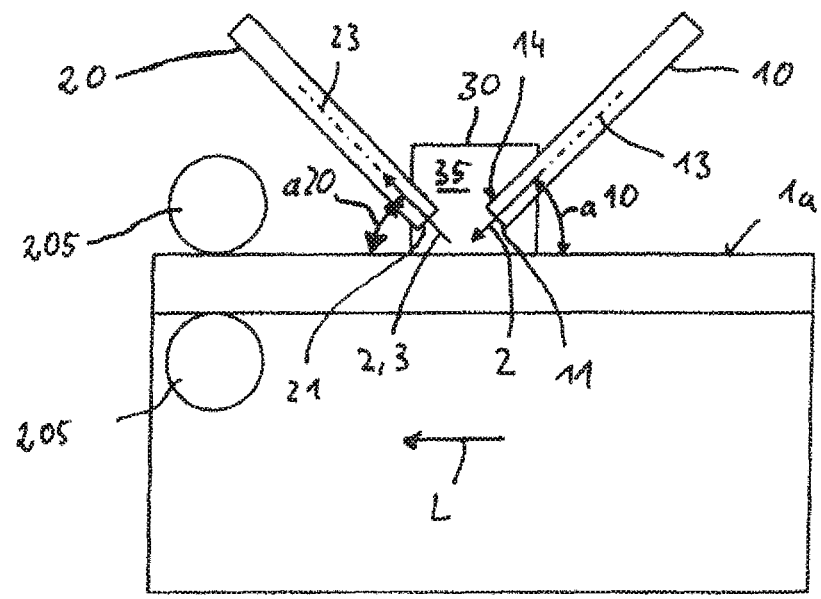
FIG. 7 shows a sectional view of a fibre composite component while a method according to a further exemplary embodiment of the present invention is being carried out.

The movement of the working device 200 and the fibre composite component 1 relative to one another may for example be performed by transporting the fibre composite component 1 by means of transporting rollers 205, as is represented by way of example in FIG. 7. Alternatively or in addition, the working device 200, in particular a feed nozzle 10 and an extraction nozzle 20 of the working device 200, may be movable by means of a manipulator (not represented) of a moving device.

As schematically represented respectively in FIGS. 5 to 8, the working device 200 comprises a feed nozzle 10, an extraction nozzle 20 and an optional bell 30.

The removal of the bonding area 1a takes place by blasting a removing agent 2 that is transported by a gaseous transporting fluid onto the surface 1a of the fibre composite component 1 through the feed nozzle 10. This is schematically shown respectively in FIGS. 5 and 7. FIG. 6 shows a view of a detail in which the processes are schematically represented in detail.

The feed nozzle 10 is fed a transporting fluid under pressure P1 and also a removing agent 2 in the form of granules or particles by way of a feeding device 201, the removing agent 2 being entrained in the flow of the transporting fluid. The flow of transporting fluid and removing agent 2 is directed onto the bonding area 1a by way of an outlet opening 11 of the feed nozzle 10. The removing agent 2 impinges on the bonding area 1a and removes material 3, in particular matrix material M, there. The transporting fluid may for example be transported to the surface 1a at a pressure P1 of between 1 bar and 5 bar above ambient pressure P0. Glass beads, corundum granules or plastic granules may be used for example as removing agent 2.

At the same time as the removal, a suction extraction of the removing agent 2 and of the removed material 3 takes place by means of the extraction nozzle 20. For this purpose, an extraction opening 21 of the extraction nozzle 20 generates a negative pressure P2, and consequently sucks in the transporting fluid and removes and transports away the removing agent 2 and also the removed material 3 from the bonding area 1a. To generate the negative pressure P2 at the extraction opening 20, the extraction nozzle 21 is connected to a suction device 202, for example in the form of a vacuum pump.

Figure 5:
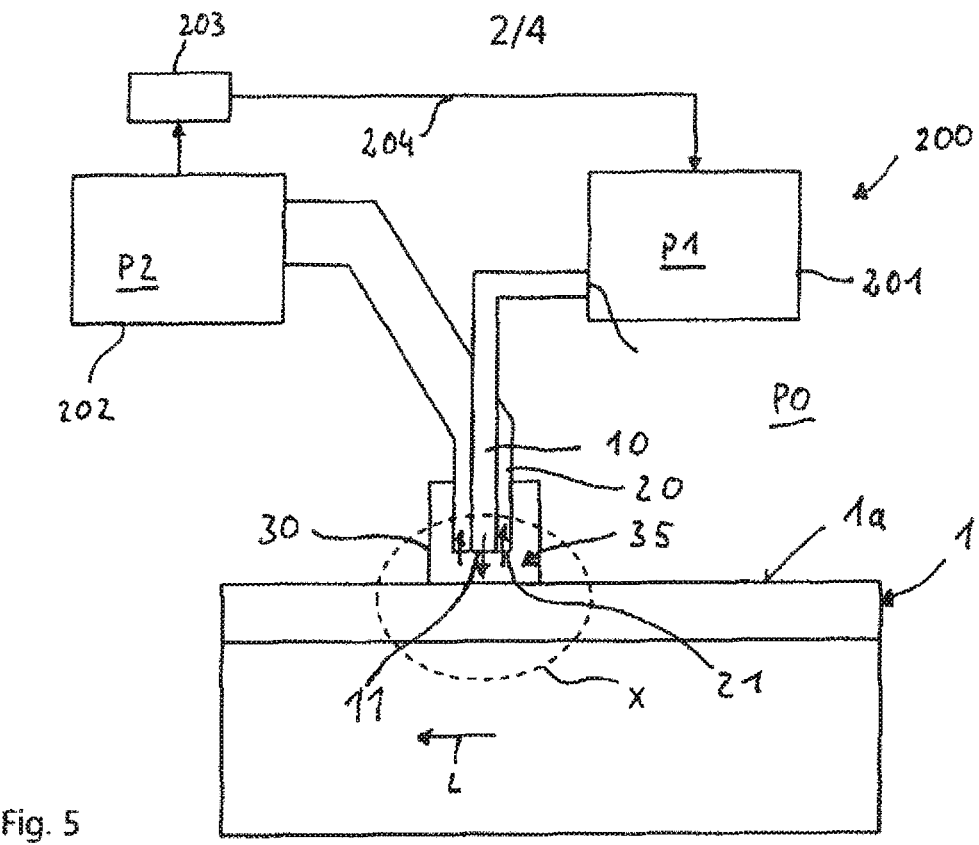
FIG. 5 shows a sectional view of a fibre composite component while a method according to a further exemplary embodiment of the present invention is being carried out.
Figure 6:
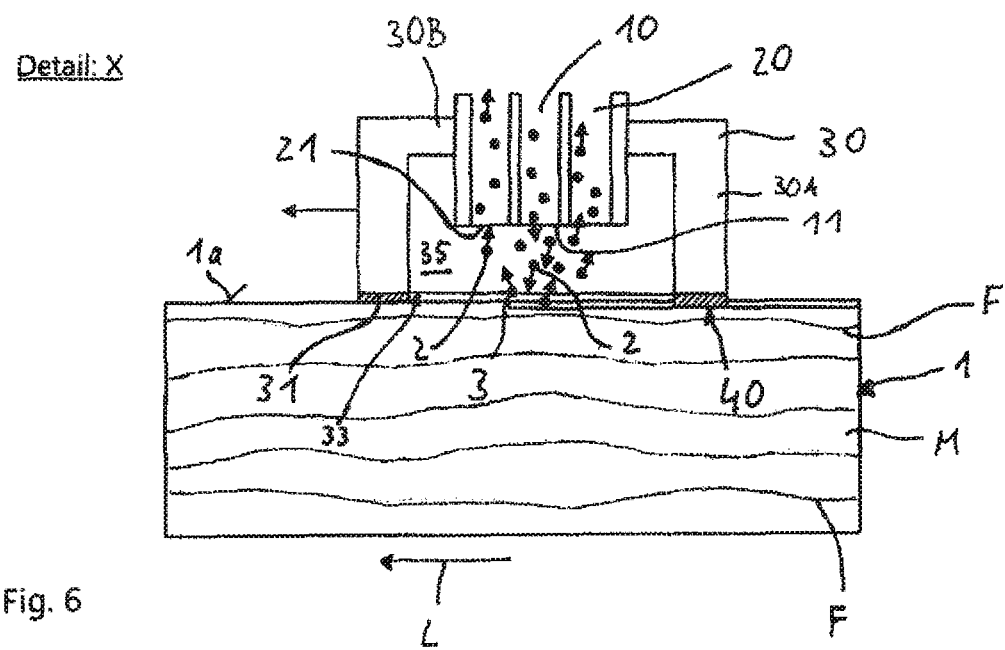
FIG. 6 shows a schematic view of a detail of the region identified in FIG. 5 by the letter X.

As shown by way of example in FIG. 5, the suction device 202 may be coupled to an optional separating device 203, in which the removed material 3 is separated from the removing agent 2. The separating device 203 may for example comprise a centrifuge (not shown) or the like. Optionally, the removing agent 2 is fed back to the feeding device 201 by way of a return line 204 from the separating device 203.

The extraction nozzle 20 is arranged in the region of the feed nozzle 10; in particular, the extraction opening 21 of the extraction nozzle 20 is arranged in the region of the outlet opening 11 of the feed nozzle 10. For example, it may be provided that the extraction nozzle 20 surrounds the feed nozzle 10 in an annular manner, as is schematically represented in FIGS. 5 and 6. Here, the removing agent 2 can be blasted onto the surface 1a in particular perpendicularly.

As an alternative to this, the feed nozzle 10 is arranged at a first angle a10 relative to the surface 1a of the fibre composite component 1. This is shown by way of example in FIG. 7, although, as a difference from FIG. 5, the feeding device 201, the suction device 202 and the separating device 203 are not shown in FIG. 7 for reasons of overall clarity. In particular, here a centre axis 13 of an end portion 14 of the feed nozzle 10, which comprises the outlet opening 11 of the feed nozzle 10, forms a first angle a10 with the surface 1a of the fibre composite component 1. This angle a10 may in particular lie between 30 degrees and 85 degrees, preferably between 45 degrees and 75 degrees. As also shown in FIG. 7, the extraction nozzle 20 may also be arranged at a second angle a20 relative to the surface 1a of the fibre composite component 1. As schematically represented in FIG. 7, here a centre axis 23 of an end portion 24 of the extraction nozzle 20, which comprises the extraction opening 21, forms a second angle a20 with the surface 1a of the fibre composite component 1. This angle a20 may in particular lie between 30 degrees and 85 degrees, preferably between 45 degrees and 75 degrees. As is also shown in FIG. 7, the extraction nozzle 20 is optionally arranged opposite the feed nozzle 10. In particular, here the extraction opening 21 and the outlet opening 11 are facing one another, or the centre axes 13, 23 of the end portions 14, 24 of the nozzles 10, 20 form an angle of between 10 degrees and 120 degrees. The centre axes 13, 23 of the end portions 14, 24 of the nozzles 10, 20 may in particular be situated in one plane.

As also shown in FIGS. 5 to 8, the blasting application of the removing agent 2 through the feed nozzle 10 may take place into a working space 35 that is formed by the optional bell 30. As can be seen in FIG. 6 in particular, the bell 30 has a peripheral side wall 30A, which defines an opening 33. This is surrounded by an abutting edge 31. Opposite the abutting edge 31, a top wall 30B is provided. During the blasting application of the removing agent 2, the bell 30 is placed onto the surface 1a of the fibre composite component 1 in such a way that the abutting edge 31 is facing the surface 1a. This has the effect of forming a closed working space 35, into which the feed nozzle 10 and the extraction nozzle 20 project. The removing agent 2 is consequently injected into the working space 35 and the removed material 3 and also the removing agent 2 are extracted from the working space 35 by suction by means of the extraction nozzle 20.

As also shown by way of example in FIG. 6, a sealing device 40 for sealing the working space 35 may be provided at the abutting edge 31 of the bell 30. For example, the sealing device 40 may, as shown in FIG. 6, be configured as a seal which is formed by a multiplicity of small plastic bristles, is placed onto the abutting edge 31 and surrounds the opening 33. This results in a tight sealing of the working space 35 with respect to the removing agent 2 and the removed material 3.

Figure 8:
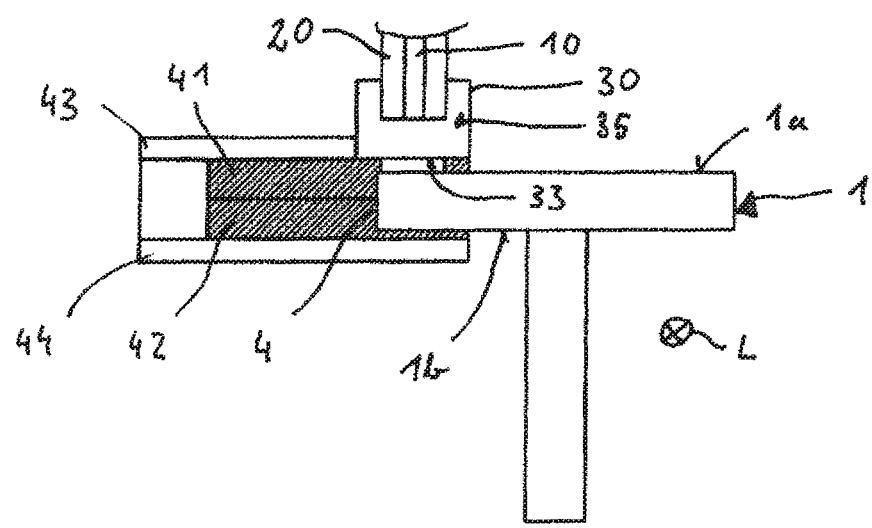
FIG. 8 shows a sectional view of a fibre composite component while a method according to a further exemplary embodiment of the present invention is being carried out.

FIG. 8 shows a further possible design of the sealing device 40. The sealing device 40 here comprises a first sealing mat 41 and a second sealing mat 42. The first sealing mat 41 surrounds the opening 33 of the bell 30 and projects beyond or from the abutting edge 31. The first and second sealing mats 41, 42 are arranged lying opposite one another and extend laterally beyond the side wall 30A of the bell 30. For example, the first sealing mat 41 may be held by a first holding plate 43 and the second sealing mat 42 may be held by a second holding plate 44. The sealing mats 41, 42 are in particular formed by an elastically deformable material, for example a plastics material, for example a foam, or by a multiplicity of small plastic bristles.

During the removal, the sealing device 40 may be pushed over a side edge 4 of the fibre composite component 1, as shown in FIG. 8 by way of example, the bonding surface 1a being brought to lie against the first sealing mat 41 and the rear surface 1b of the fibre composite component 1 that is situated opposite from the bonding surface 1a being brought to lie against the second sealing mat 42. In FIG. 8, the sealing mats 41, 42 lie against one another laterally of the side edge 4 of the fibre composite component 1. In this way, by way of example, an edge region 1A of the surface 1a of the fibre composite component 1 can be sealed with respect to a rear surface 1b of the fibre composite component 1.

Figure 9:
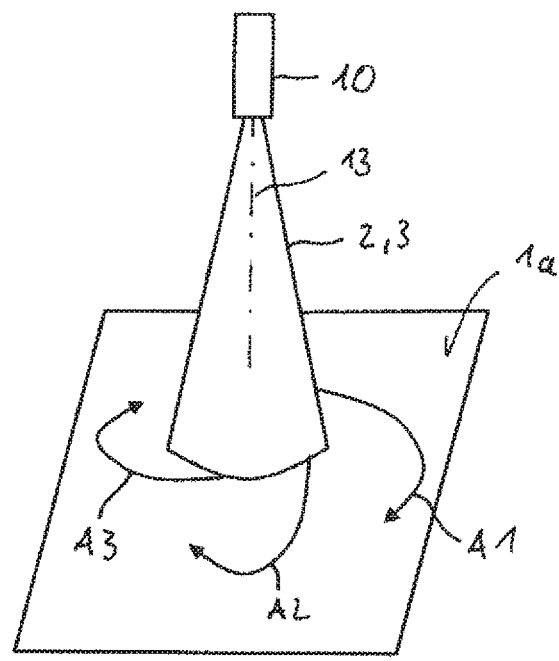
FIG. 9 shows a schematic view of an abrasive removal of a surface of a fibre composite component according to a further exemplary embodiment of the method according to the present invention.

As shown by way of example and schematically in FIG. 9, the blasting of the removing agent 2 onto the surface 1a of the fibre composite component may be performed through the feed nozzle 10 in a swirling jet. This means that the removing agent 2 and the transporting fluid 3 leave the feed nozzle 10 as a flow twisted about the centre axis 13 of the end portion 14 of the feed nozzle 10. In FIG. 9, this is symbolically indicated by the arrows A1, A2 and A3. This type of blasting application improves the removal effect.

Figure 10:
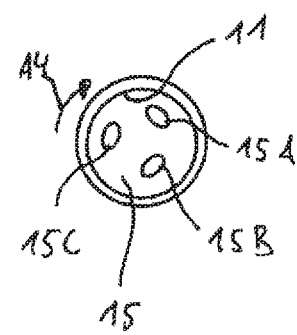
FIG. 10 shows a schematic plan view of a feed nozzle for carrying out the removal represented in FIG. 9.

Such a rotating flow may for example be generated by means of an orifice plate 15 inserted into the outlet opening 11 of the feed nozzle 10. Such an orifice plate 15 is shown by way of example in FIG. 10. The orifice plate 15 may have one or more openings 15A, 15B, 15C and is mounted in the outlet opening 11 rotatably about the centre axis 13, as indicated in FIG. 10 by arrow A4.

Figure 11:
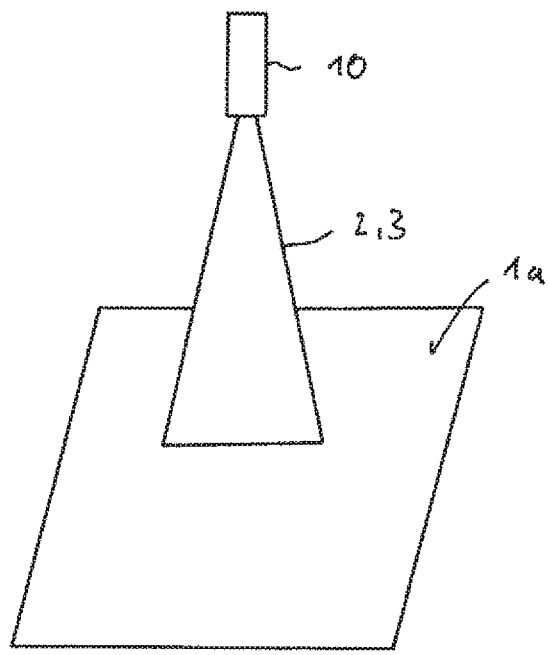
FIG. 11 shows a schematic view of an abrasive removal of a surface of a fibre composite component according to a further exemplary embodiment of the method according to the present invention.
Figure 12:
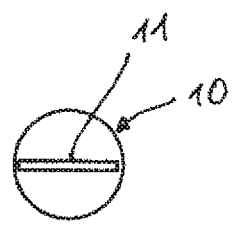
FIG. 12 shows a schematic plan view of a feed nozzle for carrying out the removal represented in FIG. 10.

As an alternative to this, it may also be provided that the blasting of the removing agent 2 onto the surface 1a of the fibre composite component is performed through the feed nozzle 10 in a flat jet, as is represented schematically and by way of example in FIG. 11. Such a jet may for example be generated by a slit-shaped design of the outlet opening 11 of the feed nozzle 10, see FIG. 12, or by inserting an orifice plate with a slit-shaped opening into the outlet opening 11 of the feed nozzle 10.

Although the present invention has been explained above by way of example on the basis of exemplary embodiments, it is not restricted to these, but instead can be modified in various ways. In particular, combinations of the foregoing exemplary embodiments are also conceivable.

LIST OF DESIGNATIONS

1 Fibre composite component
1a Surface of the fibre composite component
2 Removing agent
3 Material
4 Side edge of the fibre composite component
10 Feed nozzle
11 Outlet opening of the feed nozzle
13 Centre axis of an end portion of the feed nozzle
14 End portion of the feed nozzle
15 Orifice plate
15A-15C Openings of the orifice plate
20 Extraction nozzle
21 Extraction opening of the extraction nozzle
23 Centre axis of an end portion of the extraction nozzle
24 End portion of the extraction nozzle
30 Bell
30A Side wall of the bell 30B Top wall of the bell
31 Abutting edge
33 Opening
35 Working space
40 Sealing device
41 First sealing mat
42 Second sealing mat
43 First holding plate
44 Second holding plate
100 Structural component
101 Longitudinal web
102 Transverse web
105 Further component
106 Side webs
107, 108 Side webs
200 Working device
201 Feeding device
202 Suction device
203 Separating device
204 Return line
205 Transporting rollers
A1-A4 Arrows
a10 First angle
a20 Second angle
F Reinforcing fibres
L Longitudinal direction
M Matrix material
P0 Ambient pressure
P1 Pressure of the transporting fluid
S1 First strip
S2 Second strip While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for treating a surface of a fibre composite component, the method comprising:
abrasively removing the surface of the fibre composite component by blasting a removing agent transported by a gaseous transporting fluid onto the surface of the fibre composite component by a feed nozzle, the blasting application through the feed nozzle taking place in a working space formed by a bell placed onto the surface of the fibre composite component, and the removing agent and the removed material being extracted from the working space by suction by an extraction nozzle, the bell having an abutting edge facing the surface of the fibre composite component, and a sealing device for sealing the working space with respect to the surface of the fibre composite component being arranged at the abutting edge, the working space being sealed with respect to a rear surface of the fibre composite component during the removal of an edge region of the surface of the fibre composite component, wherein the edge region of the surface extends along a side edge of the fiber composite component, and wherein the sealing device encloses the side edge of the fiber composite component, thereby abutting the surface and the rear surface of the fiber composite component; and
extracting the removing agent and material removed by the removing agent from the working space by suction by the extraction nozzle arranged in the region of the feed nozzle.

2. The method according to claim 1, the fibre composite component extending in a longitudinal direction, the removal taking place in strips along the longitudinal direction, starting from the side edge of the fibre composite component.

3. The method according to claim 1, the extraction nozzle surrounding the feed nozzle in an annular manner.

4. The method according to claim 1, the feed nozzle being arranged at a first angle relative to the surface of the fibre composite component.

5. The method according to claim 4, the extraction nozzle being arranged at a second angle relative to the surface of the fibre composite component and opposite the feed nozzle.

6. The method according to claim 1, the transporting fluid being transported to the surface at a pressure of between 0.25 bar and 8 bar above ambient pressure.

7. The method according to claim 1, glass granules, corundum granules or plastic granules being used as the removing agent.

8. The method according to claim 1, the fibre composite component being formed by a structural component of an aircraft.

9. The method according to claim 8, wherein the structural component is a stringer.

* * * * *